United States Patent [19]

Johannesen

[11] 4,174,026
[45] Nov. 13, 1979

[54] DASH POT FOR A HYDRAULIC ACTUATOR FOR A DRUM BRAKE

[75] Inventor: Donald D. Johannesen, South Bend, Ind.

[73] Assignee: The Bendix Corporation, Southfield, Mich.

[21] Appl. No.: 956,120

[22] Filed: Oct. 30, 1978

Related U.S. Application Data

[63] Continuation of Ser. No. 833,531, Sep. 15, 1977, abandoned.

[51] Int. Cl.² .............................................. B60T 11/10
[52] U.S. Cl. ........................... 188/361; 60/590; 91/29; 91/31; 91/443; 92/143; 188/364; 192/109 D
[58] Field of Search ............... 188/351, 362, 363, 364, 188/368, 369, 370; 60/590; 91/29, 31, 443; 92/143; 192/109 D

[56] References Cited

U.S. PATENT DOCUMENTS

| | | | |
|---|---|---|---|
| 2,216,848 | 10/1940 | Loweke | 188/364 |
| 2,329,095 | 9/1943 | White | 188/364 |
| 2,585,408 | 2/1952 | Roberson | 91/443 X |
| 2,733,780 | 2/1956 | Myers | 188/369 |
| 3,078,676 | 2/1963 | Blair | 188/351 X |

FOREIGN PATENT DOCUMENTS 1001279  8/1965  United Kingdom ..................... 188/364

Primary Examiner—George E. A. Halvosa
Attorney, Agent, or Firm—Paul D. Schoenle; Ken C. Decker

[57] ABSTRACT

A drum brake assembly provides a pair of brake shoes which are movable by a hydraulic actuator to a braking position. The hydraulic actuator is carried by a backing plate and the pair of brake shoes is movable relative to the backing plate. A piston is slidably mounted within a bore on the hydraulic actuator and pressurized fluid communicated to the bore acts against the piston to move the piston and pair of brake shoes. A partition is also disposed within the bore to substantially define a secondary chamber which receives pressurized fluid from the bore. The partition is movably disposed within the bore and resiliently engaged with the piston so that increased pressure within the bore is transmitted to the piston via the partition and the resilient engagement. Moreover, the partition controls venting of the secondary chamber so that upon contact of the pair of brake shoes with a drum, backlash or retraction of the pair of brake shoes is limited.

1 Claim, 2 Drawing Figures

DASH POT FOR A HYDRAULIC ACTUATOR FOR A DRUM BRAKE

This is a continuation of application Ser. No. 833,531, filed Sept. 15, 1977, now abandoned.

BACKGROUND OF THE INVENTION

In a drum brake assembly a pair of brake shoes is urged into engagement with a drum to retard the rotation of the latter. A hydraulic actuator slidably carries a piston which abuts at least one of the pair of brake shoes and the piston is responsive to increases in pressure within the hydraulic actuator to move relative thereto, thereby moving the brake shoe into engagement with the drum.

This piston rests on a stop on the hydraulic actuator so that upon pressurization of the hydraulic actuator the piston moves away from the stop to urge the brake shoe into braking engagement with the drum. When contact between the drum and brake shoe is initially achieved, the pair of brake shoes frictionally grip the rotating drum and the pair of brake shoes is rotated slightly in the direction of rotation of the drum until one of the brake shoes abuts the stop. Further pressurization of the hydraulic actuator at this time increases the braking forces between the pair of brake shoes and the drum to retard the rotation of the drum.

When the one brake shoe abuts the hydraulic actuator stop upon initial contact between the pair of brake shoes and the drum a clunking noise occurs as the impact between the stop and the piston can be quite large. Consequently, elimination of this clunking noise by simple means without interfering with brake bleeding or imposing a delay on normal brake application rates is believed to be an improvement over the state of the art.

SUMMARY OF THE INVENTION

In a drum brake assembly, a hydraulic actuator cooperates with a pair of brake shoes to urge the latter into a braking position wherein the pair of brake shoes frictionally engage a drum to retard the rotation of the latter. A piston within a hydraulic actuator housing is responsive to pressurized fluid therein to move relative to the hydraulic actuator housing thereby pushing the pair of brake shoes into frictional engagement with the drum.

In accordance with the invention, a partition is movably disposed within the hydraulic actuator housing to cooperate with the piston to substantially define a secondary chamber. The partition also defines a restricted passage communicating the secondary chamber with an inlet and a resilient member is disposed between the partition and piston. Pressurized fluid from the inlet is communicated to the secondary chamber via the restricted passage while at the same time the forces generated by the pressurized fluid are transmitted to the piston via the movable partition and the resilient member in order to move the piston in one direction relative to the housing. If the piston movement changes relative to the housing, the pressurized fluid within the secondary chamber is further pressurized to oppose the changed movement of the piston. Concurrently, the partition vents the secondary chamber via the restricted passage to accomodate a gradual change in the direction of the piston movement. Consequently, the piston is not free to rapidly impact itself against a housing stop upon retraction, thereby eliminating or reducing the clunking noise. However, as the partition is movably disposed within the housing and resiliently engaged with the piston, pressurization of the hydraulic actuator is transmitted to the piston during a braking application, with no delay imposed by the restricted passage.

DETAILED DESCRIPTION

Figure 1:
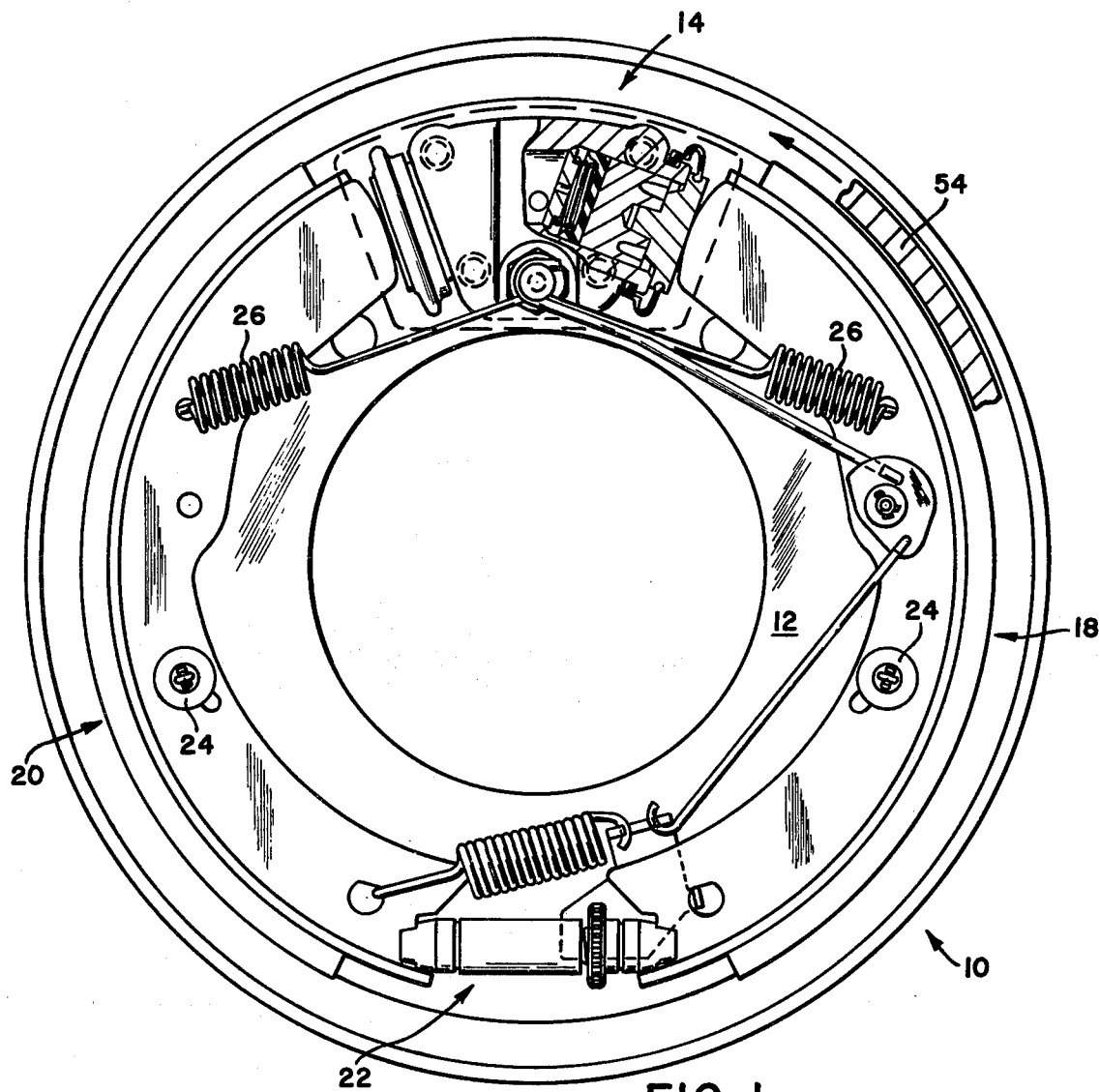
FIG. 1 is a front side view of a drum brake assembly.

In FIG. 1 a drum brake assembly generally referred to as reference numeral 10 includes a backing plate 12 which supports a hydraulic actuator 14 via fastener pins 16. A pair of brake shoes at 18 and 20 carry an adjustment mechanism at 22 opposite the hydraulic actuator 14 while hold-down springs at 24 support the pair of brake shoes on the backing plate 12. In addition, return springs at 26 retain the pair of brake shoes adjacent the hydraulic actuator 14.

Figure 2:
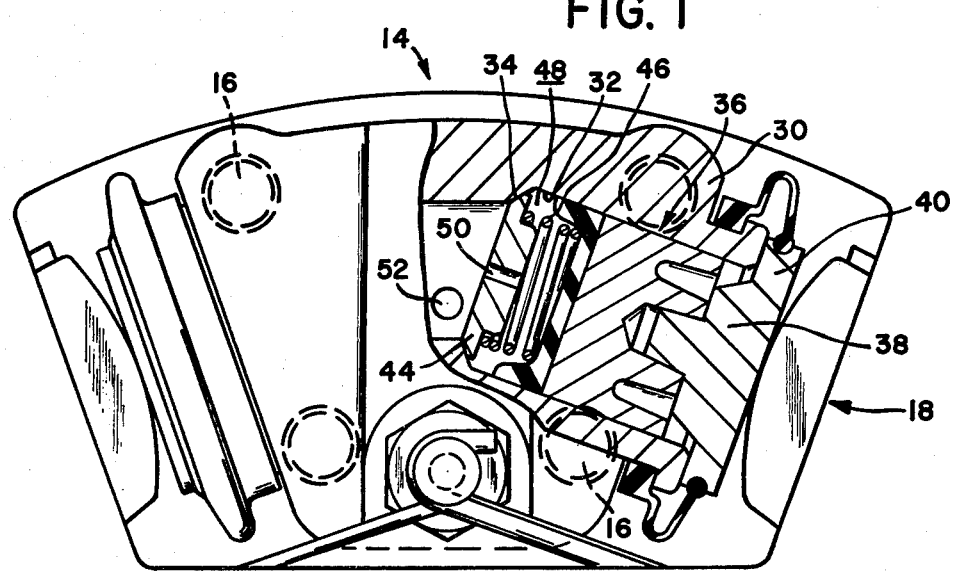
FIG. 2 is a partial cross-sectional view of the encircled portion of FIG. 1.

Turning to FIG. 2, it is seen that the hydraulic actuator 14 comprises a housing 30 having a right stepped bore 32 forming a shoulder 34. A piston 36 is slidably disposed within the stepped bore 32 and is engaged with the brake shoe 18. The piston 36 includes a plate 38 which is rigidly secured to the piston 36 and provided with a radial flange at 40 opposing the end of the housing, thereby limiting retraction of the piston 36 within the stepped bore 32. Although the description herein proceeds with reference to the right stepped bore 32 and the piston 36, it is clear that the housing 30 includes a similar left stepped bore and piston.

In accordance with the invention, a partition 44 is movably disposed within the stepped bore 32 and is normally maintained in abutment with the shoulder 34 by means of a resilient member 46. The partition 44 cooperates with the piston 36 to substantially define a secondary chamber 48 which receives the resilient member 46. A restriction passage at 50 communicates the secondary chamber 48 with an inlet port 52 so that pressurized fluid communicated to the stepped bore 32 via the inlet port 52 will be communicated to the secondary chamber 48 via the restriction passage 50.

MODE OF OPERATION

When a brake application is effected, pressurized fluid is communicated to the stepped bore 32 via the inlet port 52. This pressurized fluid is communicated to the secondary chamber 48 via the restriction passage 50 wherein the piston 36 is movable in response to the pressurized fluid within the secondary chamber 48 in order to urge the brake shoe 18 into frictional engagement with a drum 54. If the pressure of the pressurized fluid communicated to the stepped bore 32 is above a predetermined value, the force generated thereby is sufficient to move the partition away from the shoulder 34 to contract the resilient member 46, thereby transmitting the increase in the pressure of the pressurized fluid to the piston 36 upon a brake application, and also communicating the increased pressurized fluid to the secondary chamber 48 via a clearance between the stepped bore 32 and the partition 44.

When the pair of brake shoes initially contact the rotating drum 54, the brake shoes frictionally grip the drum so that the brake shoes are rotated slightly in the direction of the rotating drum. This reaction by the pair of brake shoes causes the brake shoe 18 to force the piston 36 to retract within the stepped bore 32. Consequently, the pressure of the pressurized fluid within the secondary chamber is increased to move the partition 44 in abutment with the shoulder 34. Thereafter, the increase in the pressure of the pressurized fluid within the secondary chamber 48 opposes any retraction of the piston 36 so that the flange 40 attached to the piston will not impact against the end of the housing 30. However, as the increased pressurized fluid within the secondary chamber 48 is vented via restricted passage 50 to the stepped bore 32 the piston 36 gradually retracts within the stepped bore 32 until the flange 40 abuts the end of the housing, thereby stopping retraction of the piston 36.

After this initial contact, further braking increases the pressure of pressurized fluid communicated through the inlet port 52 to urge the left piston (not shown) to move the pair of brake shoes into tighter frictional engagement with the rotating drum in order to retard the rotation of the latter. At this time the piston 36 and the flange 40 act as an anchor to oppose rotation of the brake shoe 18, directly, and the brake shoe 20, indirectly, via adjustment means 22, with the rotating drum 54.

If the drum 54 is rotating in a clockwise direction, opposite to the direction illustrated in FIG. 1, then the initial contact between the pair of brake shoes and the drum will cause the brake shoe 20 to urge a left piston (not shown) in a left stepped bore (not shown) to retract therein in a similar manner as the right piston 36. Moreover, a similar partition (not shown) is movably disposed within the left stepped bore to control the retraction of the left piston upon initial contact of the pair of brake shoes with the clockwise rotating drum.

Although venting of the secondary chamber 48 is provided by the restricted passage 50, it is possible for the partition 44 to form a restricted passage with the shoulder 34, thereby eliminating the necessity for the passage 50.

It is also apparent that many alternatives and/or modifications to the present invention are possible by those skilled in the art. Accordingly, these alternative and/or modifications are intended to fall within the scope of the appended claims.

I claim:

1. In a hydraulic actuator having a housing communicating pressurized fluid to a stepped bore therein via an inlet and a piston slidably disposed within the stepped bore engaging a brake shoe for urging the brake shoe from a normal position to a braking position when the pressure communicated to the bore is above a predetermined value, the improvement in which a partition is movably disposed within the stepped bore, said partition being connected to the piston by resilient means and being movable within the stepped bore in response to pressurized fluid therein for transmitting the force created by the pressurized fluid within the stepped bore during braking to the piston, said partition being biased by said resilient means into engagement with a shoulder defined by the stepped bore and also cooperating with said piston to substantially define a secondary chamber communicating with the inlet via a restrictive passage substantially defined by said partition, the piston including a portion in abutment with the housing when the brake shoe is in the normal position, the fluid pressure within the secondary chamber increasing as the brake shoe moves from the braking position to the normal position and the partition is in engagement with the shoulder, and said partition regulating reduction of the increased fluid pressure in the secondary chamber as the brake shoe moves from the braking position to the normal position in order to provide for gradual retraction of said piston portion into abutment with the housing, so as to substantially eliminate noise when the piston portion abuts the housing.

* * * * *